United States Patent Office 3,707,397
Patented Dec. 26, 1972

---

3,707,397
PROCESS FOR PROVIDING UNIFORM ORGANO-POLYSILOXANE COATINGS ON POLYCARBONATE AND ACRYLIC SURFACES
Donald W. Gagnon, Sylvania, Ohio, assignor to Owens-Illinois, Inc.
No Drawing. Filed Feb. 26, 1971, Ser. No. 119,344
Int. Cl. B44d 1/14; B32b 27/30
U.S. Cl. 117—72                                    11 Claims

---

ABSTRACT OF THE DISCLOSURE

Process, and the article produced thereby, for providing a uniformly and tenaciously adhered, hard, acetone-resistant and mar-resistant coating on articles having a solid polycarbonate or acrylic surface. The process includes priming the polymeric surface with an adhesion promoting, thermosettable acrylic by forming a thin film thereon, then coating the primed surface with a solution of a precured solvent-soluble, further-curable organopolysiloxane in an organic solvent and thereafter evaporating the solvent and finally curing the organopolysiloxane to a thermoset condition. The solvent-soluble, further-curable organopolysiloxane is produced by heating methyltrialkoxysilane, phenyltrialkoxysilane or mixtures thereof and water in the presence of an effective catalytic amount of a hydrolysis catalyst, e.g., HCl, at a sufficient temperature and for a time sufficient to form a partial condensation product, concentrating this product by heating to remove some alkanol by-product and water and thereafter precuring the product by heating below the gel point thereof.

---

This invention generally relates to coatings for polymeric surfaces; more particularly, it relates to organopolysiloxane coatings for polymeric surfaces; and still more particularly, it relates to a technique for providing uniformly and tenaciously adhered organopolysiloxane coatings on solid polymeric surfaces.

In order to provide solid plastic surfaces and substrates with many beneficial properties and especially, substrates or surfaces composed of polycarbonate or acrylic compositions, these surfaces have been coated with certain materials. U.S. Pat. No. 3,451,838 discloses a coating technique for the application of organopolysiloxane coatings onto these surfaces. The resulting coatings have many desirable properties, for example, they are clear, glossy, hard, mar-resistant, scratch-resistant; they exhibit excellent resistance to attack by polar organic solvents such as, for example, the ketones and especially acetone. The resulting polymeric substrates with the organopolysiloxane coated surfaces have a wide utility including their use as liners, safety laminates and viewing closures, for example, face plates and window applications, as, for example, windshields in vehicles. Unfortunately, these organopolysiloxane coatings, although possessing many desirable properties, do not in all instances possess the desired degree of uniform adherence to the polymeric surfaces. Thus, the organopolysiloxane coated polymeric substrates would receive even more use in the art if a technique could be devised for more uniformly and tenaciously bonding the organopolysiloxane to the polymeric surfaces. This is especially true with regard to solid polycarbonate substrates as well as to solid acrylic substrates, both of which have utility as viewing closures.

With the foregoing in mind, it is an object of this invention to produce tenaciously adhered, organopolysiloxane coatings on polymeric surfaces.

Yet another object of this invention is to provide a method for increasing the adhesive bond of an organopolysiloxane to a polymeric surface.

Yet another object of this invention is to tenaciously and uniformly bond a thermoset organopolysiloxane onto a polycarbonate or acrylic surface.

Still another object of this invention is to provide a tenaciously adhered, hard, solvent-resistant, scratch-resistant, mar-resistant organopolysiloxane onto articles having a polycarbonate or acrylic surface.

A still further object of this invention is to provide for organopolysiloxane coatings which are uniformly and tenaciously bonded to solid polymeric surfaces such as, for example, polycarbonate resins and acrylic resins.

According to one aspect of this invention, prior to the application of a solution of a solvent-soluble, further-curable organopolysiloxane to a polymeric surface, the surface is first primed by the application of a solution of a partially polymerized acrylic composition.

The partially polymerized acrylic compositions which are advantageously employed as a priming material in accordance with this invention are those acrylic compositions well known in the art as thermosettable acrylics. Exemplary thermosettable acrylics which may be employed in the practice of this invention are set forth, for example, in Encyclopedia of Polymer Science and Technology, vol. 1, Interscience Publishers, John Wiley & Sons, Inc., copyright 1964, at p. 273 et seq., and in the Chemistry of Organic Film Formers, by D. H. Solomon, John Wiley & Sons, Inc., 1967, at p. 251 et seq. and the references cited therein, all of which are hereby incorporated by reference. The known thermosettable acrylic compositions which are advantageously employed as a primer in this invention are those acrylics which are solvent-soluble, and which may be further cured to a thermoset condition.

The solvent-soluble, thermosettable acrylics as contemplated herein may be categorized in three general classes. One of these classes represents an acrylic copolymer having reactive functional groups which are capable of reacting between themselves to effect a cross-linkage thereof. It will, of course, be apparent that these functional groups may be the same, provided they are of the type which will react between themselves, or the copolymer may have two different types of reactive functional groups therein, such as, for example, an epoxide group and a carboxyl group. Another type is an acrylic copolymer having a reactive functional group to which there is added an appropriate compatible accelerator, or polymeric cross-linking agent, which will react with the functional group to effect the needed cross-linking. A common thermoset acrylic is a copolymer of styrene and/or methylacrylate, ethylacrylate, and acrylamide or methacrylamide which is converted to a thermoset acrylic by post-reaction with formaldehyde and an alcohol. The other type, which is actually a modification of the type immediately described above represents a mixture of two polymers having cross-linkable functional reactive groups. Both of these polymers may be acrylic copolymers having reactable, cross-linkable, functional groups thereon, or one of the polymers may be an acrylic copolymer having a reactive functional group and the other polymer may represent one or more other types of known polymers having functional groups which likewise are reactable with the acrylic functional group to provide the thermoset product as a result of cross-linking.

Representative of the latter type of thermosettable acrylics are mixtures of an acrylic copolymer containing copolymerized acrylamide units and a urea formaldehyde resin, an acrylic copolymer containing copolymerized acrylic acid or methacrylic acid units and a bis-phenol A-type epoxy resin, an acrylic copolymer containing reactable carboxyl and hydroxyl functional groups and an amine formaldehyde resin. Another system which is in effect a mixture of polymers is a mixture of an acrylic copolymer, wherein one of the monomers is methacrylic acid or acrylc acid, a partially condensed phenyl formaldehyde resin and a polyepoxide resin, which ternary mixture may be cured to a thermoset condition, for example, by employing a butylated melamine resin as a catalyst.

Typically, the reactions involved in cross-linking the solvent-soluble, thermosettable, acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups; inter-reaction between carboxyl and isocyanate groups; reactions between hydroxyl, for example polyols, and isocyanate groups, and reactions between amine groups and N-methylol or N-methylol-ether groups. Those skilled in the art will readily select the appropriate system for their particular purposes. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_3$) alkyl acrylic ester or mixtures thereof, e.g., methyl acrylate, ethyl acrylate, methyl methacrylate, ethyl methacrylate, styrene, or mixtures thereof, in an amount ranging between about 75 parts to about 99 parts and, more typically, between about 80 parts to about 97 parts.

A suitable, partially polymerized, further-curable, thermosettable acrylic which may be employed as the primer in accordance with this invention is produced by copylmerizing between about 0 to 70 parts by weight of styrene, preferably 30–50 parts, along with about 10 to about 60 parts, preferably 30–50 parts by weight of lower alkyl acrylic ester, e.g. methyl acrylate, methyl methacrylate, ethyl acrylate, ethyl methacrylate, or mixtures thereof, about 6 to about 14 parts by weight of glycidyl acrylate, glycidyl methacrylate, glycidyl crotonate, or mixtures thereof, along with about 3 to about 9 parts by weight of acrylic acid or methacrylic acid under such conditions that no reaction occurs between the epoxide ring of the glycidyl ester and the carboxylic acid group of the acid. For further particulars in this regard, reference may be had, for example, to U.S. Pat. No. 2,604,463, which is hereby incorporated by reference. By forming the thermosettable copolymer as generally described above, a linear, further-curable, thermoplastic copolymer is obtained which is substantially free of any cross-linkage but which will cross-link or thermoset when later heated by the reaction between the reactive acid groups and the reactive epoxide groups. In the usual procedure for preparing these copolymers, which in themselves contain the needed reactive functional groups for producing a thermoset acrylic, the total amount of the glycidyl ester and the total amount of the acid present, will generally be less than about 20 parts by weight and the weight ratio of the total amount of the glycidyl ester to the total acid present will generally be between about 1 to about 1.5.

The thermosettable acrylics as described above are applied as primers in a solution of a suitable, compatible, organic solvent. While those skilled in the art will readily select appropriate concentrations of the thermosettable acrylic in the solution, suitable concentrations range between about .5 to about 85 percent by weight and preferably, the concentration will be about .5 to about 3 percent by weight. Those skilled in the art will also readily select an appropriate solvent, but it is generally preferred that the solvent employed be relatively volatile, that is, that the solvent, after the solution has been applied to the substrates for priming, will be such that it will substantially vaporize when allowed to set at room temperature for several hours, say on the order of 3 or 4 hours, or that the solvent be such that it can be substantially vaporized within several minutes to one-half hour by mild heating to, for example, up to about 90° C. Of course, solvents may be employed which do not have these general volatility characteristics, but it will be more inconvenient to do so inasmuch as longer times and higher temperatures will generally be needed to evaporate the solvent so as to deposit from the solution a layer of the thermosettable priming acrylic. Usually, the thickness of the priming layer which is employed will vary between approximately 0.01 mil up to as much as 0.5 mil or even more, if desired. While the solvent will generally depend upon the type of acrylic functionality being employed and will be so selected that its use provides a solution and does not cause the gelation, suitable solvents may, for example, include the ketones, such as, for example, acetone, methyl ethyl ketone, ethyl butyl ketone and the like, or the C–1 to C–5 alkanols, for example, normal butanol.

After the polymeric surfaces which are to be coated have been primed by the application of the solution of the thermosettable acrylic, and the solvent for the acrylic has been allowed to evaporate, the primed surface is then coated with a solvent solution of a solvent-soluble, further-curable organopolysiloxane. The solvent for the organopolysiloxane is then evaporated and the organopolysiloxane is finally cured to a thermoset state, thereby providing a tenaciously adhered, hard, solvent-resistant, scratch-resistant, mar-resistant coating on the polymeric surface. The curing may be effected by heating between about 25° C. to about 225° C. or even higher for times between about 1 or 2 minutes to as much as 2 or 3 days. Lower temperatures, of course, require longer curing times. The concentration of the organopolysiloxane solutions will be readily selected by those skilled in the art to suit their convenience but, typically, these solutions may comprise from about 5 to about 85 percent by weight of the organopolysiloxane composition, with a more preferred concentration generally being between about 40 to about 60 percent by weight of the organopolysiloxane. While a plurality of organic solvents may be utilized for producing the solution of the organopolysiloxane, polar organic solvents are generally well suited for this purpose. Examples of solvents which may be employed include methanol, ethanol, butanol, acetone, ethyl acetate, dioxane, benzene, xylene, toluene, ethylene glycol monomethyl ether, ethylene glycol monomethyl ether acetate, ethylene glycol ethyl ether, ethylene glycol ethyl ether acetate, ethylene glycol dibutyl ether, and the like.

Advantageously, the solvent-soluble, further-curable organopolysiloxane which is employed is a hydrolysis and condensation product of methyltrialkoxysilane, phenyltrialkoxysilane, or a mixture thereof, wherein the alkoxy group contains from 1 to 5 carbon atoms, e.g., methoxy, ethoxy, isopropoxy, pentoxy, and the like. This solvent-soluble, further-curable organo-polysiloxane is prepared by a process wherein methyltrialkoxysilane, phenyltrialkoxysilane, or a mixture of methyltrialkoxysilane and phenyltrialkoxysilane, in which the alkoxy group contains from 1 to 5 carbon atoms, is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove about 50 to about 90 mole percent alkanol by-product and some water, and thereafter, the concentrated partial condensation product is precured by heating at a temperature below the gel point thereof and generally in the range of about 70° to 300° C. to produce the solvent-soluble, further-curable organopolysiloxane. This precured solvent-soluble, further-curable organopolysiloxane is then dissolved in a suitable solvent and the primed polymeric surface is coated therewith. The solvent is then evaporated and the residual further-curable organopolysiloxane finally cured to a thermoset state to provide a uniformly and tenaciously adhered coating on the polymeric surface.

A particular solvent-soluble, further-curable organopolysiloxane which is advantageously employed as the coating composition is a hydrolysis and condensation product of methyltriethoxysilane. This solvent-soluble, further-curable organopolysiloxane is prepared by a process wherein methyltriethoxysilane is hydrolyzed with water (at least about 1.5 moles of water per mole of silane) in the presence of an effective amount of a hydrolysis catalyst, for example, HCl, for about 1 to 10 hours at a temperature generally between about 40° C. and reflux temperature, preferably between the temperature range of about 50° C. to about 90° C. to produce a partial condensation product; the partial condensation product is then concentrated by heating to about 65° to about 300° C. and, preferably, within the temperature range of about 70° C. to about 150° C. to remove some alkanol by-product and water. The concentrated product is then precured at a temperature of about 70° to about 300° C. and below the gel point thereof and then solidified to provide a solid, solvent-soluble, further-curable organopolysiloxane. The solid, solvent-soluble, further-curable organopolysiloxane is then dissolved, for example, to a concentration of about 5 to about 85 percent by weight, in a suitable solvent, and the solution then applied to the primed polymeric surface, after which the solvent is evaporated and the organopolysiloxane finally cured to provide a glossy, tenaciously adhered, hard, solvent-resistant, mar-resistant, scratch-resistant, thermoset coating on the polymeric surface. The solidification referred to above may comprise cooling or may include the flaking or spray drying techniques respectively disclosed in U.S. Pat. No. 3,414,540 and U.S. Pat. No. 3,383,773. Optionally, instead of solidifying the precured organopolysiloxane to provide the solid, solvent-soluble, further-curable organopolysiloxane, the solidification may be omitted and the precured organopolysiloxane dissolved in a suitable solvent and then applied to the primed polymeric surface.

Another solvent-soluble, further-curable organopolysiloxane which is advantageously applied to the primed polymeric surface, as contemplated in this invention, is the hydrolysis and condensation product of a mixture of methyltriethoxysilane and phenyltriethoxysilane. This organopolysiloxane is prepared by a process wherein a mixture of methyltriethoxysilane and phenyltriethoxysilane is hydrolyzed with water (at least about 1.5 moles water per mole of total silane) in the presence of a hydrolysis catalyst, for example, HCl, for about 1 to 10 hours, at a temperature between ambient and reflux, preferably between about 40° C. and about 100° C. to produce a partial condensation product; the partial condensation product is then concentrated by heating to remove about 50 to 90 mole percent alkanol by-product and some water; the concentrated product is then pre-cured at a temperature of about 70° to about 300 or 400° C., usually less than about 250° C., and below the gel point thereof, and then solidified to provide a solid, solvent-soluble, further-curable organopolysiloxane. The solid, solvent-soluble, further-curable organopolysiloxane is then dissolved, for example, to a concentration of about 5 percent to 85 percent by weight in a suitable solvent and the solution then applied to the primed polymeric surface, after which time the solvent is evaporated and the further-curable, solvent-soluble organopolysiloxane finally cured to provide a tenaciously and uniformly adhered, hard, scratch-resistant, mar-resistant, solvent-resistant, glossy, thermoset coating on the polymeric surface. As indicated above, the solidification may comprise cooling or include flaking or spray drying techniques. Additionally, and as indicated above, instead of solidifying the precured, further-curable, solvent-soluble organopolysiloxane, the precured product may be dissolved in a suitable solvent and then applied to the primed polymeric surface.

For further details regarding the preparation of the solvent-soluble, further-curable organopolysiloxanes, which are advantageously employed in producing polymeric coated articles, reference may be had to U.S. Pat. No. 3,389,114 and U.S. Pat. No. 3,389,121, both of which are hereby incorporated by reference. Additionally, U.S. Pats. Nos. 3,383,773 and 3,414,540 relating to the preparation of solid, solvent-soluble, further-curable organopolysiloxanes, are also hereby incorporated by reference.

It will, of course, be apparent that the solution of the further-curable, solvent-soluble organopolysiloxane which is employed to coat the polymeric surfaces, may include suitable adjuvants, such as fillers, colorants, U-V absorbers, and dopants.

Two types of polymeric surfaces which are especially advantageously primed in accordance with the teachings of this invention for purposes of providing a uniformly and tenaciously adhered organopolysiloxane coating thereon are the solid polycarbonate substrates and the solid acrylic substrates. Suitable solid polycarbonate substrates and surfaces which may be primed and coated as contemplated in this invention are described, for example, in Kirk-Othmer Encyclopedia of Chemical Technology, 2nd edition, volume 16, at pages 106–116, and are additionally discussed in the Encyclopedia of Polymer Science and Technology, volume 10, at pages 710–764, (copyright 1969 by John Wiley & Sons, Inc.). Most advantageously, the solid polycarbonates which are employed are of the polyaryl carbonate type, having a number average molecular weight of about 16,000 to about 24,000 or even higher. Exemplary of this type of polyaryl carbonate is the polycarbonate structure represented below:

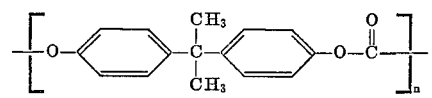

wherein $n$ is an integer in the range of about 60 to about 90 or even higher. These polycarbonates are commercially available and one such suitable polycarbonate is that commercially supplied under the trademark Lexan. The acrylic substrates suitable for use in this invention can be prepared from a monomer or mixture of monomers having the general formula

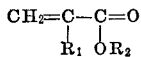

where $R_2$ is an alkyl group of 1 to 3 carbon atoms and $R_1$ is H or an alkyl group of 1 to 2 carbon atoms. The above acrylic monomers can also be used in an amount of about 100 parts by weight with about 2 to 30 parts by weight of another copolymerizable monomer such as styrene, butadiene, ethylene and the like, to provide suitable copolymeric acrylic substrates. Exemplary of these types of preferred acrylic resins are polyethylmethacrylate, polyethylacrylate, with polymethylmethacrylate being a highly preferred acrylic resin.

In passing, it is worth mentioning that the polymeric surfaces such as, for example, the polycarbonate and acrylic substrates as described above have been primed by using conventional flame treating techniques or conventional acid etching techniques. These two types of priming techniques, however, are not entirely satisfactory in that they produce spotty results. That is, the adhesion is not uniform in that in certain areas the organopolysiloxanes will be found to be more strongly bonded than in other areas. Presumably, this is the result of a nonuniform priming of the surface. By priming the polymeric surfaces as contemplated in this invention, it will be found that a more uniform, tenacious bond of the organopolysiloxane to the polymeric substrate or surface will be produced. Additionally, the flame treating techniques and acid etching techniques are not well adapted for commercial operations, at least not in an economical operation, whereas the priming technique of this invention will not have this drawback.

The following examples are illustrative of the manner of practicing this invention, it, of course, being understood that the examples are not to be construed as limiting the invention, but merely set forth the exemplary manner of using the invention.

EXAMPLE 1-A

A solvent-soluble, further-curable organopolysiloxane prepolymer product was prepared by hydrolyzing and condensing about one mole of methyltriethoxysilane with about 2½ moles of water and about 3 weight parts of HCl per million parts of water and silane, the silane first being purified by distillation to about zero parts per million of HCl.

The reaction mixture was heated with agitation in a flask equipped with a condenser until the pot temperature reached about 80° C. This temperature was maintained for about 4 hours. After about 20 minutes, the two-phase reaction mixture clarified to a one-phase system due to the ethanol liberated in the reaction acting as a mutual solvent. At the end of the four hour period, approximately 78 grams of an ethanol-water mixture (about 92% alcohol) was removed by distillation. The hydrolysis and condensation reaction, and concentration thereafter, produced a viscous liquid. The viscous liquid prepolymer was refluxed at 50 percent solids for 20 hours to increase the viscosity to 30 centipoises at 50% solids at 20° C. in ethanol.

The viscous liquid having a viscosity of about 30 centipoises at 50% solids at 25° C. in ethanol was further treated and precured by forming a film thereof and heating the film in a wiped film evaporator. The evaporator was operated at a wall temperature of about 200° C. which provides a product temperature of about 160° C. The mean residence time in the evaporator was about 20 seconds. The resultant liquid precured material was solidified in about 1 to 1½ minutes and broken up into flakes by a drum flaker unit. These flakes of the solvent-soluble, further-curable organopolysiloxane were then dissolved in normal butanol to a resin solid concentration of about 40 percent by weight. The resultant solution was then filtered to remove possible contaminants such as dust and dirt.

EXAMPLE 1-B

A commercially available thermosettable acrylic (32% solids in butanol) was diluted with n-butanol to a solids concentration of 1%. One such product is available from Bee Chemical Company as their EV-6174.

Into this solution there was then dipped a clear, generally rigid, polycarbonate substrate having a thickness of about one-eighth inch and characterized by the repeating structural unit:

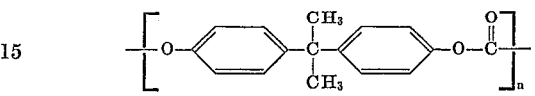

This type of polycarbonate is commercially available and supplied under the trademark Lexan. The polycarbonate substrate was then removed from the priming solution and was allowed to remain in the open air for about 30 minutes, during which time the solvent from the priming solution evaporated and deposited a thin priming film on the polycarbonate surface.

EXAMPLE 1-C

The procedure of Example 1-B was repeated except instead of employing the polycarbonate substrate, an approximately one-eighth inch thick clear polymethyl methacrylate substrate was employed, thereby producing a primed acrylic substrate.

EXAMPLE 1-D

Both of the primed substrates as produced in Examples 1-B and 1-C supra, to wit, the primed polycarbonate substrate and the primed acrylic substrate, were then dipped into the 40 percent organopolysiloxane solution as prepared in 1-A above. While dipping constitutes one mode of coating the substrate, it, of course, will be apparent that other conventional coating techniques such as, for example, spray, roller, or flow coating techniques may also be employed. The primed polycarbonate and primed acrylic substrates which now had been dip-coated with the organopolysiloxane solution, were allowed to remain in the open air for a sufficient time to allow the solvent for the organopolysiloxane solution to evaporate, thereby resulting in the formation of an organopolysiloxane coating on the primed substrates. The resulting organopolysiloxane coating was then cured to a thermoset condition by heating at a temperature of about 135° C. for about 30 minutes in a forced air circulating oven. The resulting thermoset organopolysiloxane coating had a thickness of about one-half to three-fourths mil. Both coated substrates were then tested in the manner hereinafter described.

The polycarbonate and acrylic substrates which now possess a clear, glossy, thermoset organopolysiloxane coating thereon were then tested to determine the adhesion, acetone resistance, and hardness of the coated surface.

Th acetone resistance was determined by wiping the coated surface with a tissue which had been saturated with acetone and then visually observing the coated surface after it had dried. If the coating becomes cloudy, the acetone resistance is generally designated as poor, whereas, if there is no deterioration in the coating's appearance, an excellent designation is employed. The polycarbonate and acrylic substrates having the clear glossy, cured organopolysiloxane resin coating showed excellent acetone resistance. That is, the clear coating showed no signs of cloudiness after the acetone wiping.

The adhesion of the coating is determined by scribing an X in the coated surface and then applying adhesive tape to the scribed section. Upon pulling of the tape, if there is no noticeable removal of the coating, it is designated "excellent." No coating removal was discernible when the primed coated substrates of this example were so tested.

The hardness of the polycarbonate and acrylic coated substrates was then determined by a so-called pencil-hardness test. According to this test, two steps are involved. First of all, the fingernail is firmly translated along the coating and if the coating mars, the test is discontinued and the coating is deemed to have poor hardness. If, on the other hand, no marring is produced, graphite pencils of increasing hardness are successively drawn across the coated surface until a noticeable scribing or surface penetration appears. The pencil or graphite hardness producing the scribe thus becomes the coating hardness designation. The coatings are produced hereinbefore have a hardness of approximately 7H which is considered excellent.

EXAMPLE 2

The procedure as set forth in Examples 1–A, 1–B, 1–C and 1–D were generally repeated, with the exception that instead of employing a further-curable, solvent-soluble organopolysiloxane which had been manufactured from a methyltriethoxysilane precursor, the further-curable, solvent-soluble organopolysiloxane employed in this example, was the prepolymer prepared from a mixture of methyltriethoxysilane and phenyltriethoxysilane. The results as set forth in Example 1–D were substantially identical, employing this specific organopolysiloxane. That is, the resulting coatings on the primed polycarbonate and acrylic surfaces showed excellent hardness, excellent acetone resistance, and excellent adhesion.

The specific further-curable, solvent-soluble organopolysiloxane prepolymer was prepared from methyltriethoxysilane and phenyltriethoxysilane using two moles of the methyl silane precursor and one mole of the phenyl silane precursor. The mixture of methyl and phenyl triethoxysilanes was hydrolyzed and condensed with nine moles of water (3 moles of water/mole of total silane) and about 2.5 parts of HCl per million parts of water and silane, the silanes first being purified by distillation to about zero parts per million HCl.

The reaction mixture was heated with agitation in a flask equipped with a condenser until the pot temperature reached about 80° C. This temperature was maintained for four hours. After about 20 minutes, the two-phase reaction mixture clarified to a one-phase system due to the ethanol liberated in the reaction acting as a mutual solvent. At the end of the four-hour period, approximately 282 grams of an ethanol-water mixture (about 92 percent alcohol) was removed by distillation. The hydrolysis and condensation reaction and the concentration by removal of alkanol by-product and water thereafter produced a viscous liquid. The viscous liquid, having a viscosity of about 40 centipoises and 60 percent solids at 25° C. in ethanol was refluxed for 15 hours to provide same with a heat history and a final viscosity of about 60 centipoises at 60 percent solids at 25° C.

The liquid was then precured in a wiped film evaporator operating at about 195–200° C. wall temperature to provide a liquid product temperature of about 170–175° C. for mean residence time of less than 40 seconds, namely, about 20 seconds. The resultant precured material was chilled and solidified in about 60 seconds by passing the liquid through a drum flaker. The liquid was solidified into sheets which were broken up into flakes which had a melting point of about 55° C. and were substantially free from gel.

These flakes were then employed in the manner as set forth in Examples I–A, B, C and D with gamma-amino propyltriethoxysilane being employed as a curing catalyst by adding it to the 40% solution in an amount of about 1% by weight of the resin. The coatings had substantially the same properties as set forth in I–D.

EXAMPLE 3

The procedures of Example 1 (A through D inclusive), as well as Example 2, are then repeated with substantially the same results being obtained by using as the primer a 1 percent solution of an acrylic copolymer which is further curable to a thermoset condition wherein the copolymer is prepared as set forth hereinafter. About 40 parts of styrene, 40 parts of methyl acrylate, 9 parts of glycidyl methacrylate, and 6 parts of methacrylic acid, are dissolved in 50 parts of methyl ethyl ketone and 50 parts of xylene and the solution is heated at 70° C. for about 15 hours in the presence of two parts of azobis(isobutyronitrile). A thermoplastic copolymer solution, which is further curable to a thermoset condition, is obtained, having a viscosity of about 3.7 poises with a monomer conversion of about 94%. To this solution there is then added an additional amount of methyl ethyl ketone so as to produce a solution of this copolymer wherein the concentration of the copolymer in solution is about 1% by weight. This solution is then employed as the priming liquid to form a priming layer of the thermosettable copolymer on the polycarbonate and acrylic substrates with the solvent being evaporated. Subsequently, the organopolysiloxane solutions are applied to the primed substrate in the manner set forth above with the solutions having approximately one percent by weight of the organopolysiloxane resin, a catalyst which is gamma-aminopropyltriethoxysilane. After curing of the organopolysiloxane, there is produced a uniformly and tenaciously adhered, hard, acetone-resistant and mar-resistant coating on the substrates.

While the invention has been described above with particularity, it will, of course, be apparent that modifications may be made which, pursuant to the patent statutes and laws, do not depart from the spirit and scope of the invention.

I claim:
1. A process for providing a uniformly and tenaciously adhered, hard, acetone-resistant and mar-resistant coating on a polycarbonate or acrylic surface which comprises:
 (a) priming said surface with an effective priming amount of a thermosettable acrylic composition, and thereafter
 (b) applying a solution of a solvent-soluble, further-curable organopolysiloxane onto said primed surface, said solvent-soluble, further-curable organopolysiloxane being a hydrolysis and condensation product of methyltrialkoxysilane, phenyltrialkoxysilane or a mixture thereof, wherein the alkoxy group contains 1 to 5 carbon atoms prepared by:
  (1) heating said silane and water, wherein the molar ratio of water to total silane is at least about 1.5:1, in the presence of an effective amount of a hydrolysis catalyst for about 1 to about 10 hours at a temperature between ambient and reflux to produce a siloxane partial condensation product,
  (2) concentrating the partial condensation product by heating to remove alkanol by-product and some water,
  (3) precuring the concentrated product by heating at a temperature below the gel point thereof to produce said solvent-soluble, further-curable organopolysiloxane,
 (c) and curing said further-curable organopolysiloxane to a thermoset condition and thereby producing said coating.

2. The process as defined in claim 1 wherein said silane is methyltrialkoxysilane.

3. The process as defined in claim 1 wherein said silane is a mixture of methyltrialkoxysilane and phenyltrialkoxysilane.

4. The process of claim 1 wherein said alkoxy group contains two carbon atoms.

5. The process of claim 1 wherein step (c) is effected at a temperature between about 25° C. and about 225° C.

6. The process of claim 1 wherein said surface is an acrylic surface.

7. The process of claim 1 wherein said surface is a polycarbonate surface.

8. A process for providing a uniformly and tenaciously adhered, hard, acetone-resistant and mar-resistant coating on a polycarbonate or acrylic surface which comprises:
 (a) depositing a priming layer of a thermosettable acrylic composition on said surface from a solution,
 (b) coating said priming layer with a solution of a solvent-soluble, further-curable organopolysiloxane, said further-curable organopolysiloxane being prepared by
  (1) heating methyltriethoxysilane and water, wherein the molar ratio of water per mole of silane is at least about 1.5:1, in the presence of an effective catalytic amount of a hydrolysis catalyst for about 1 to 10 hours at a temperature between about 50° C. and about 90° C. to produce a partial condensation product,
  (2) concentrating the partial condensation product by heating to a temperature between about 70° C. and about 150° C. to remove about 50 to about 90 mole percent alkanol by-product and some water,
  (3) precuring the concentrated product by heating below the gel point thereof, and thereafter
 (c) heating said further-curable organopolysiloxane to cure same and thereby produce said coating on said surface.

9. A method for producing a uniformly and tenaciously adhered, hard, acetone-resistant and mar-resistant coating on articles having a polycarbonate or acrylic surface which comprises:
 (a) forming a priming layer of a thermosettable acrylic on said surface by applying a solution of said thermosettable acrylic onto said surface and allowing the solvent to evaporate,
 (b) applying a solution of a further-curable, solvent-soluble organopolysiloxane onto said surface, said organopolysiloxane being prepared by
  (1) heating a mixture of methyltriethoxysilane and phenyltriethoxysilane and water, wherein the water is present in an amount of at least about 1.5 moles per mole of total silane, in the presence of an effective hydrolyzing amount of a hydrolysis catalyst for about 1 to 10 hours be-between a temperature of about 40° C. and 100° C.,
  (2) concentrating the product of Step (1) by heating to remove about 50 to about 90 mole percent alkanol by-product and some water,
  (3) precuring the concentrated product of Step 2 by heating below the gel point thereof to produce said solvent-soluble, further-curable organpolysiloxane, and
 (c) heating said organopolysiloxane to further cure same to a thermoset condition and provide said uniformly and tenaciously adhered, hard, acetone-resistant and mar-resistant coating on said surface.

10. In a process for providing a hard, acetone-resistant, mar-resistant, thermoset organopolysiloxane coating onto an acrylic or polycarbonate surface, wherein said surface is coated with a solution of a solvent-soluble, further-curable organopolysiloxane and said further-crurable organopolysiloxane is then cured to a thermoset condition and wherein said solvent-soluble, further-curable organopolysiloxane is prepared by a process which comprises heating methyltrialkoxysilane, phenyltrialkoxysilane, or mixtures thereof, wherein the alkoxy group contains 1 to 5 carbon atoms, with water, wherein the molar ratio of water to total silane is at least about 1.5:1, in the presence of an effective catalytic amount of a hydrolysis catalyst for about 1 to about 10 hours at a temperature between ambient and reflux to produce a siloxane partial condensation product and then concentrating the partial condensation product by heating to remove alkanol by-product and water, the improvement comprising providing a more tenacious and uniform adhesive bond by priming said acrylic or polycarbonate surface prior to the application of said solution thereto with an effective priming amount of a thermosettable acrylic composition.

11. The product produced by the process of claim 10.

References Cited

UNITED STATES PATENTS

| | | | |
|---|---|---|---|
| 3,451,838 | 6/1969 | Burzynski et al. | 117—138.8 F X |
| 3,265,764 | 8/1966 | Deichert et al. | 117—138 UA X |
| 3,488,215 | 1/1970 | Shepherd et al. | 117—138.8 UA F |
| 3,515,579 | 6/1970 | Shepherd et al. | 117—138.8 F X |
| 3,387,988 | 6/1968 | De Lapp et al. | 117—138.8 UA X |

RALPH HUSACK, Primary Examiner

U.S. Cl. X.R.

117—76 F, 138.8 F, 138.8 UA

Disclaimer and Dedication 3,707,397.—*Donald W. Gagnon*, Sylvania, Ohio. PROCESS FOR PROVIDING UNIFORM ORGANOPOLYSILOXANE COATINGS ON POLYCARBONATE AND ACRYLIC SURFACES. Patent dated Dec. 26, 1972. Disclaimer and dedication filed Oct. 9, 1973, by the assignee, *Owens-Illinois, Inc.*

Hereby disclaims and dedicates to the Public the entire remaining term of said patent.

[*Official Gazette February 5, 1974*]